United States Patent Office 2,786,360
Patented Mar. 26, 1957

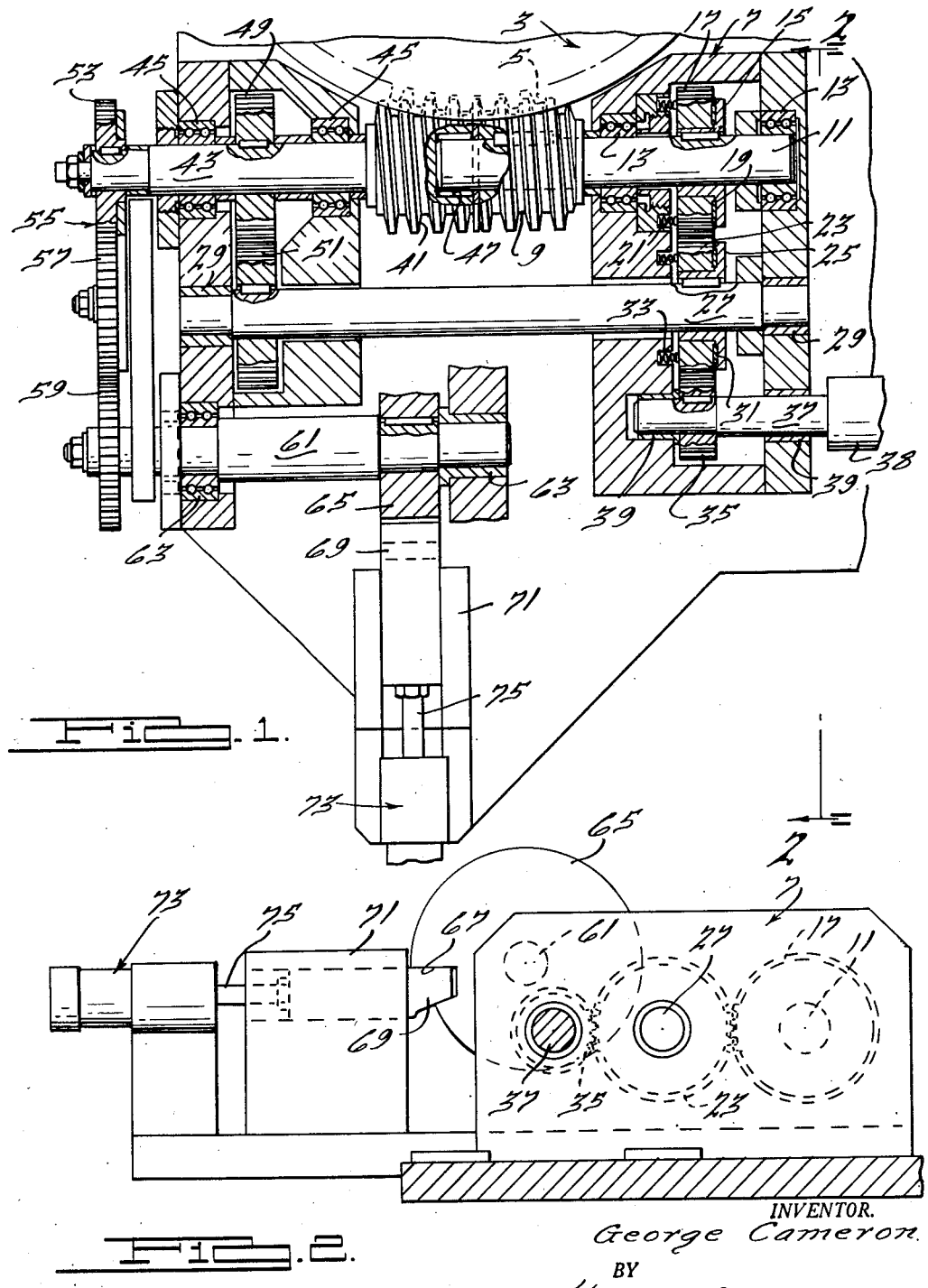

2,786,360

INDEXING MECHANISM

George Cameron, Birmingham, Mich., assignor to Colonial Broach & Machine Company, Detroit, Mich., a corporation of Delaware Application January 23, 1956, Serial No. 560,805

5 Claims. (Cl. 74—84)

This invention relates generally to work mechanisms, and more particularly to an improved gear type indexing mechanism or the like incorporating an anti-backlash arrangement.

In many work mechanisms, such as indexing mechanisms, it is desired to move a driven member a predetermined distance or through a predetermined path. This is most often accomplished through a gearing mechanism, and in precision operations, it is desirable that all backlash be removed so that the movement of the driven member can be accurately controlled, which, of course, is not possible if there is any backlash in the mechanism.

It is an object of this invention to provide a work mechanism of the aforementioned type incorporating improved means for eliminating backlash so that the position and movement of a driven member can be accurately controlled.

It is a still further object of this invention to provide a work mechanism of the aforementioned type which is relatively inexpensive to manufacture, durable in construction, and positive in operation.

It is a still further object of this invention to provide a work mechanism of the aforementioned type in which a member driven by gears can be accurately indexed a plurality of times through a given distance or desired path of movement.

It is a still further object of this invention to provide a work mechanism of the aforementioned type which can be easily adjusted or adapted to index or move the driven member through different distances or paths of travel.

These and other objects of this invention will become apparent from the following detailed description taken in conjunction with the accompanying drawing, in which:

Figure 1 is a top view partially in section and partially in elevation of a work mechanism of this invention; and Fig. 2 is a view partially in section and partially in elevation of the structure illustrated in Figure 1, taken along the line 2—2 thereof.

While the work mechanism of this invention is illustrated and described as an indexing mechanism for moving a driven member or work table through a desired angular path of movement, it will be appreciated that this mechanism may be used in many installations where it is desired to accurately control the movement of a member and eliminate gear backlash in the mechanism.

In the illustrated embodiment, a driven member 3 is illustrated which may be an indexing plate or work table and which is circular in form having gear teeth 5 on the periphery thereof adapted to mesh with a worm gear, so that the member is a worm wheel in a worm gear system or mechanism. The driven member 3 is rotatably supported in suitable supporting structure 7 of a machine or the like, and the gear teeth 5 mesh with the teeth of a worm gear 9 which is keyed to one end of a shaft 11. Shaft 11 is rotatably supported in the supporting structure 7 by any suitable means, such as bearings 13. A slip clutch driving member 15 is keyed to the shaft 11 and rotatably supports a gear 17. A friction clutch plate 19, which may be of any suitable material, such as cork, is disposed between the clutch member 15 and the gear 17, and the gear 17 is urged into engagement with the clutch plate 19 by means of coil springs 21 so that the gear 17 will rotate with the shaft 11 and the clutch member 15 unless the shaft 11 is held against movement, in which event, the gear 17 may still be rotated because of the slippage permitted between the clutch plate and the gear. The gear 17 meshes with a gear 23 which is rotatably supported on a slip clutch member 25 keyed to a shaft 27 which is rotatably supported in the supporting structure 7 by any suitable means, such as bushings 29. A friction clutch plate 31, similar to the plate 19 previously described, is disposed between the clutch member 25 and the gear 23, and the gear is urged into engagement with the clutch plate 31 by coil springs 33 so that while the gear 23 and shaft 27 normally will rotate together, relative movement may occur if the load on one of the members exceeds the frictional load between the gear and the clutch plate. The gear 23 meshes with a gear 35 keyed to an input shaft 37 which is rotatably supported in the supporting structure 7 by any suitable means, such as bushings 39. The input shaft 37 is connected with a suitable driving mechanism 38, such as a motor and speed reducer, or the like, which, in this particular instance, is designed for constant movement when the machine, in which this work mechanism is incorporated, is in use. The driven member 3 is, therefore, adapted to be driven by the driving gear 9 when the input shaft 37 is rotated, but if the gear 9 is prevented from rotating, as will hereinafter appear, the input shaft will still rotate, so long as it is being driven by mechanism 38.

A second worm or locking gear 41 meshes with gear teeth 5 on the driven member 3, and the gear teeth of the worm gear are cut so as to have a locking angle with the gear teeth 5 of the driven member so that the driven member 3 cannot drive the worm gears, and so that when the worm gear 41 is held against rotation, the driven member 3 will be held against rotation. The worm gear 41 must, of course, be precision formed so that there is no backlash between gear 41 and gear teeth 5. The worm gear 41 is keyed to a shaft 43 which, in turn, is rotatably supported in the supporting structure 7, by any suitable means, such as bearings 45. It will be noted that the inner end of the worm gear 41 is recessed at 47 so as to receive the inner end of the shaft 11 which carries the driving worm 9. The inner end of the shaft 11 thus rotatably supports the inner end of the locking gear 41, but it will be understood that the gears 41 and 9 may be completely separated from each other and not disposed in alignment or end-to-end relationship without departing from the scope of this invention. A gear 49 is keyed to the shaft 43 and meshes with a gear 51 keyed to the opposite end of the shaft 27 from the gear 23 so that when the shaft 27 is rotated, gear 51 and gear 49, and thus shaft 43 and locking gear 41, will be rotated. A gear 53 of a change speed gearing arrangement 55 is keyed to the outer end of shaft 43. Gear 53 meshes with an intermediate gear 57 which is rotatably supported on the supporting structure 7, and the gear 57 meshes with a third gear 59 in the change speed gearing which, in turn, is mounted on the outer end of a shaft 61 which is rotatably supported in the supporting structure 7 by any suitable means, such as bearings or bushings 63. In view of the fact that the change speed gears always rotate in the same direction, there is no backlash problem in this gear system.

A cam-like member 65 is keyed to the shaft 61 inwardly of the gear 59. The cam member 65 is provided with a radially inwardly extending recess 67 adapted to receive a shot pin 69. The shot pin 69 is supported in a support member 71 for movement toward and away from cam member 65, and is adapted to be actuated by a piston and cylinder unit 73 which is supported on supporting structure 7. When the shot pin 69 is in its innermost position, such as illustrated in Fig. 2, the cam member, which is adapted to rotate in a counterclockwise direction, is held against rotation by shot pin 69, preventing rotation of the shaft 61, the change speed gearing 55, the shaft 43, the locking gear 41, and thus the driven member 3. The shot pin 69 is adapted to be moved out of engagement with the recess 67 by actuating the piston and cylinder unit 73 so as to cause the piston rod 75, which is connected with the shot pin 69, to move to the left.

The inner end of the shot pin will then ride against the periphery of the cam until the recess again comes into alignment therewith, at which time the shot pin will move back into the recess to again prevent rotation of the cam member 65, and thus the locking gear 41. The piston and cylinder unit 73 is adapted to be connected with the machine mechanism in which this work mechanism is incorporated so as to operate automatically through electrical interlocks or the like to permit the driven member 3 to be indexed or moved automatically at periodic intervals.

In operation, when it is desired to index or move the indexing member or driven member 3 through a desired angular path, the shot pin 69 is moved out of engagement with the cam member recess 67 so as to permit the cam member 65 to rotate. The input shaft 37, which is being constantly driven, will then drive the shaft 27 and the shaft 11 through the gearing and slip clutches 15 and 25 so as to cause rotation of the driving gear 9 and the locking gear 41, which rotation will cause rotation of the driven member 3. The cam member 65 in turn will be driven through rotation of the shaft 43, the change speed gearing 55 and the shaft 61, and as soon as the cam member has completed its rotation so as to bring the recess 67 again into alignment with the shot pin 69, the shot pin will be moved into the recess 67 by the piston and cylinder unit 73 to lock cam member 65 against rotation. When this occurs, rotation of the shaft 61, change speed gearing 55, shaft 43 and the locking worm gear 41 is prevented. At the same time, the driving worm gear 9 is attempting to rotate because the input shaft 37 is still rotating. In view of the slip clutches between the gears 17 and 23 and their shafts 11 and 27, respectively, the gear 9 can only rotate until the gear teeth 5 on the driven member 3 engage one side of the gear teeth of the worm gear 41. Thereafter, the gear 9 cannot rotate the member 3 because it is held against rotation by the locking gear 41, but the gear 9 is always under some load and is attempting to rotate the driven member 3. Therefore, while the gears 9 and 41, their supporting shafts, and shaft 27 cannot rotate, the slip clutches 15 and 25 permit the input shaft 37, as well as gears 35, 23 and 17, to rotate.

The driven member 3 will thus have been moved accurately through a predetermined angular distance or path, and all backlash between the driving gears and the driven member will be eliminated because of the engagement of the gear teeth 5 with one side of the teeth of the worm gear 41. When it is desired to again index the driven member 3 through an identical arcuate distance, the piston and cylinder unit 73 is automatically actuated so as to withdraw the shot pin 69 from the recess 67 in the cam 65. As soon as this withdrawal has occurred, the worm gears 9 and 41 are free to rotate and the driven member 3 will be rotated through its desired angular distance until the shot pin 69 again engages in the recess of the cam so that once again the locking action between the worm gears and the worm wheel or driven member 3 will occur and all backlash again will be removed. The angular distance of rotation of the driven member 3, which occurs during each complete cycle or 360-degree rotation of the cam 65 can be varied by changing the change speed gearing 55. That is, the change speed gearing 55 may be altered to permit a greater or lesser angular movement of the driven member 3 for each 360-degrees of rotation of the cam member 65.

It will thus be appreciated that a work mechanism is provided in which the driven member can be accurately indexed or moved through a predetermined arcuate path, and wherein backlash between the driving and driven members is eliminated, thus insuring identical movement of the driven member during each indexing operation. It will also be appreciated that the work mechanism has wide versatility because the indexing movement of the driven member 3 can be varied for different work operations by merely changing the change speed gearing. It will also be appreciated that, in view of the slip clutch arrangement provided, the input shaft 37 can be continually rotated by its driving motor, thus permitting automatic operation of the machine to be satisfactorily performed at all times.

What is claimed is:

1. In a work mechanism, a driven gear, a driving gear meshing with said driven gear so that rotation of said driving gear will cause rotation of said driven gear, means including slip drive means for driving said driving gear which permit rotation of said driving gear to be stopped without stopping said driving means, a locking gear meshing with said driven gear, means connected with said locking gear actuatable to prevent rotation of the same and to thereby lock said driven gear against rotation by said driving gear, and means drivingly interconnecting said locking gear with said driving gear drive means so that said locking gear will aid said driving gear in rotating said driven gear except when said locking gear is retained against rotation.

2. In a work mechanism, a rotatably supported driven gear, a rotatably supported driving gear meshing with said driven gear so that rotation of said driving gear will cause rotation of said driven gear, means for driving said driving gear including an input shaft and gearing and slip clutch means between said input shaft and said driving gear which will permit said input shaft to rotate even when said driving gear is retained against rotation, a rotatably supported locking gear meshing with said driven gear and adapted to prevent rotation of said driven gear when said locking gear is retained against rotation, means connected with said locking gear and actuatable to a first position to retain said locking gear against rotation and to a second position to permit said locking gear to rotate, and means interconnecting said gearing and slip clutch means with said locking gear so that said locking gear will be driven by said driving gear driving means when said locking gear is not retained against rotation.

3. A work mechanism including a rotatably supported worm wheel having gear teeth on the periphery thereof, a rotatably supported worm having gear teeth meshing with said worm wheel teeth so that rotation of said worm will cause rotation of said worm wheel, means for rotatably driving said worm including an input shaft and gearing and slip clutch means between said input shaft and said worm, a second rotatably supported worm having gear teeth meshing with said worm wheel teeth, said worm gear teeth having a locking angle with respect to said worm wheel gear teeth so that when said second worm is retained against rotation said worm wheel will be retained against rotation, means operatively connected with said second worm actuatable between a first position to retain said worm against rotation and a second position to permit the same to rotate, and means operatively interconnecting said gearing and said slip clutch means and said second worm so that said second worm will be driven by said first worm driving means when said second worm is free to rotate, whereby when said second worm is retained against rotation said first worm can rotate said worm wheel only until the gear teeth on said worm wheel engage the gear teeth on said second worm thereby removing all backlash between the worm wheel and the worms.

4. A work mechanism including a rotatably supported driven gear, a rotatably supported driving gear meshing with said driven gear so that rotation of said driving gear will cause rotation of said driven gear, means for rotatably driving said driving gear including gearing and slip clutch means, a rotatably supported locking gear meshing with said driven gear and adapted to be retained against rotation so as to retain said driven gear against rotation, a rotatable member drivingly interconnected with said locking gear, an actuatable stop member movable relative to said rotatable member, complemental stop means on said stop member and said rotatable member engageable when said stop member is in one position to retain said rotatable member against rotation and permitting said rotatable member to rotate when said stop member is in another position, and means operatively interconnecting said locking gear with said gearing and slip clutch means so that when said locking gear is free to rotate it will be rotatably driven through said driving gear driving means.

5. A work mechanism including a rotatably supported driven gear, a rotatably supported driving gear meshing with said driven gear so that rotation of said driving gear will cause rotation of said driven gear, means including slip drive means for rotatably driving said driving gear which permit rotation of said driving gear to be stopped without stopping said driving means, a rotatably supported locking gear meshing with said driven gear and adapted to be retained against rotation so as to retain said driven gear against rotation, a rotatable member, means operatively interconnecting said locking gear and said rotatable member including change speed gearing, an actuatable stop member movable relative to said rotatable member, complemental stop means on said stop member and said rotatable member engageable when said stop member is in one position to retain said rotatable member against rotation and permitting said rotatable member to rotate when said stop member is in another position, and means operatively interconnecting said locking gear with said driving gear drive means so that when said locking gear is free to rotate it will be rotatably driven by said driving gear drive means.

References Cited in the file of this patent

UNITED STATES PATENTS

| | | |
|---|---|---|
| 1,274,918 | Maag | Aug. 6, 1918 |
| 1,549,399 | Williams | Aug. 11, 1925 |
| 2,209,858 | Steiert | July 30, 1940 |